United States Patent
Delavaux et al.

(10) Patent No.: US 6,429,964 B1
(45) Date of Patent: Aug. 6, 2002

(54) HIGH POWER, MULTIPLE-TAP CO-DOPED OPTICAL AMPLIFIER

(75) Inventors: Jean-Marc Pierre Delavaux, Franklin Township, Hunterdon County, NJ (US); Aydin Yeniay, Bethlehem, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 44 days.

(21) Appl. No.: 09/584,901

(22) Filed: May 31, 2000

Related U.S. Application Data
(60) Provisional application No. 60/155,986, filed on Sep. 24, 1999.

(51) Int. Cl.[7] .................................................. H01S 3/00
(52) U.S. Cl. .................................. 359/337.3; 359/337.4
(58) Field of Search ....................... 385/31, 123; 372/6, 372/68; 359/337.3, 337.4, 341.3, 349, 341.32

(56) References Cited

U.S. PATENT DOCUMENTS

| | | |
|---|---|---|
| 5,166,821 A | 11/1992 | Huber |
| 5,329,396 A | 7/1994 | Fishman et al. |
| 5,721,635 A * | 2/1998 | Shigematsu et al. ........ 359/341 |
| 5,731,892 A * | 3/1998 | DiGiovanni et al. ........ 359/341 |
| 6,178,276 B1 * | 1/2001 | Mackie ......................... 385/28 |
| 6,282,334 B1 * | 8/2001 | Hodgson et al. .............. 385/12 |

OTHER PUBLICATIONS

Delavaux et al., "High Performance Er–Yr Planar Waveugide Amplifiers as In–Line and Pre–Amplifiers in 10 Gb/s Fiber System Experiments." ECOC '96. Sep. 15–19, 1996. vol. 5, pp. 23–26.*

Delavaux et al., "Muliple Carrier Analog Transmission system with Er/sup 3+/doped planar optical waveguide amplifiers", OFC 2000. Mar. 7–10, 2000. vol. 4. pp. 64–66.*

Delavaux et al., "Low–noise 1–watt Er/Yb fiber amplifier for CATV distribution in HFC and FTTH/C systems." OFC 2000. Mar. 7–10, 2000. vol. 4. pp. 58–60.*

* cited by examiner

Primary Examiner—Thomas H. Tarcza
Assistant Examiner—Deandra M. Hughes
(74) Attorney, Agent, or Firm—Wendy W. Koba, Esq.

(57) ABSTRACT

A high power optical amplifier with a multiple-tap output includes a preamplifier stage (such as an EDFA), followed by a power amplifier comprises a concatenated set of co-doped optical amplifier stages. Each amplifier stage includes a tap/power extractor for removing a portion of the amplified input signal, allowing for the pump signal(s) and remaining amplified input signal to be applied as an input to the following stage.

15 Claims, 5 Drawing Sheets

HIGH POWER, MULTIPLE-TAP CO-DOPED OPTICAL AMPLIFIER

CROSS REFERENCE TO RELATED APPLICATIONS

This application claims priority of Provisional Application No. 60/155,986, filed Sep. 24, 1999.

TECHNICAL FIELD

The present invention relates to a high power doped fiber amplifier including an rare earth-doped fiber pre-amplifier (low noise) stage and a high power rare earth-ytterbium co-doped, multiple-tap output stage.

BACKGROUND OF THE INVENTION

In the last decade, rare-earth doped fiber amplifiers in general, and erbium doped fiber amplifiers (EDFAs) in particular, have been extensively used in optical communication systems as a means to amplify weak optical signals between telecommunications links, particularly signals at or near the 1550 nm wavelength. Various designs of these amplifiers have been proposed to provide efficient performance, where efficiency is measured in terms of high optical gain, low noise figure, high output power and pump efficiency. Recently, with the use of EDFAs in applications such as multiple WDM systems and analog CATV systems, high optical power (along with low noise) has become essential in order to overcome the splitting losses and to have relatively high optical power at the receivers. High power levels can be achieved by increasing the pump power near the 980 nm or 1480 nm wavelengths. However, the semiconductor lasers conventionally used to emit at these wavelengths are problematic in terms of power scalability and overall lifetime.

As an alternative to providing an increased power for these newer applications, co-doping of the fiber amplifier has been proposed, where in most cases a co-doping of $Er^{+3}$ and $Yb^{+3}$ is used. Such a co-doping increases the amount of pump absorption and offers a flexibility in selection of the pump wavelength, owing to the broad absorption band of $Yb^{+3}$ (from 800 to 1100 nm) in glass. In glass fibers which contain phosphorus, ytterbium can absorb pump power available from diode-pumped Yb or Nd-doped laser sources near 1064 nm and efficiently transfer the energy to erbium ions for power application near 1550 nm. To date, several fiber amplifiers with $Er^{+3}$-$Yb^{+3}$ co-doping that are pumped with a 1064 nm Yb or Nd-cladded pumping lasers have been demonstrated with co-, counter-, or side-pumping schemes. When using these amplifiers in WDM or CATV systems, the output power is split into many channels by means of a coupler (e.g., 1×8, 1×16 power splitters). However, problems exist with these arrangements that limit the amplifier's performance. In particular, allowing the propagation of a high power signal in a single optical fiber causes nonlinearities (such as four-wave mixing) that reduce the performance of the amplifier. Also, the amplifier output power is directly reduced by the splitting losses associated with the following splitter. Further, in situations involving even higher power levels (for example, a few watts) specially-designed optical components (e.g., high power connectors, couplers) may be required.

Thus, a need remains in the prior art for providing an optical amplifier design that is useful in high power, multiple output applications such as CATV and WDM systems.

SUMMARY OF THE INVENTION

The need remaining in the prior art is addressed by the present invention, which relates to a high power doped fiber amplifier including a rare earth-doped fiber pre-amplifier (low noise) stage and multiple-tap high power rare earth-ytterbium co-doped output stage.

In accordance with the present invention, the multiple-tap high power output amplifier stage comprises a plurality of concatenated sections of co-doped fiber, each separately amplified. An amplified output signal is thus tapped off of each region where two contiguous doped fibers are joined.

In one embodiment of the present invention, the concatenation region comprises a pair of multiplexers and an isolator, used to remove only the amplified information signal and allow most of the pump signal to remain within the doped fiber as it is coupled to the next stage.

In a preferred embodiment, both a co-propagating pump signal and counter-propagating pump signal are applied as inputs to the string of concatenated co-doped fiber sections.

Other and further embodiments of the present invention will become apparent during the course of the following discussed and by reference to the accompanying drawings.

BRIEF DESCRIPTION OF THE DRAWINGS

Referring now to the drawings.

DETAILED DESCRIPTION

Throughout the course of the following discussion, the subject matter of the present invention will be discussed in the context of an $Er^{+3}$-doped pre-amplifier stage and an $Er^{+3}$-$Yb^{+3}$ co-doped multiple, parallel output stage. It is to be understood that various other compositions are well-known in the art that may be used as dopants for either stage. For example, praseodymium is another dopant that may be used (either alone or in association with erbium or other rare-earth dopants). Various combinations are possible and all may be used in the arrangement of the present invention to provide both a "low noise" preamplifier stage and a "high power" multiple-tap output stage.

Figure 1:
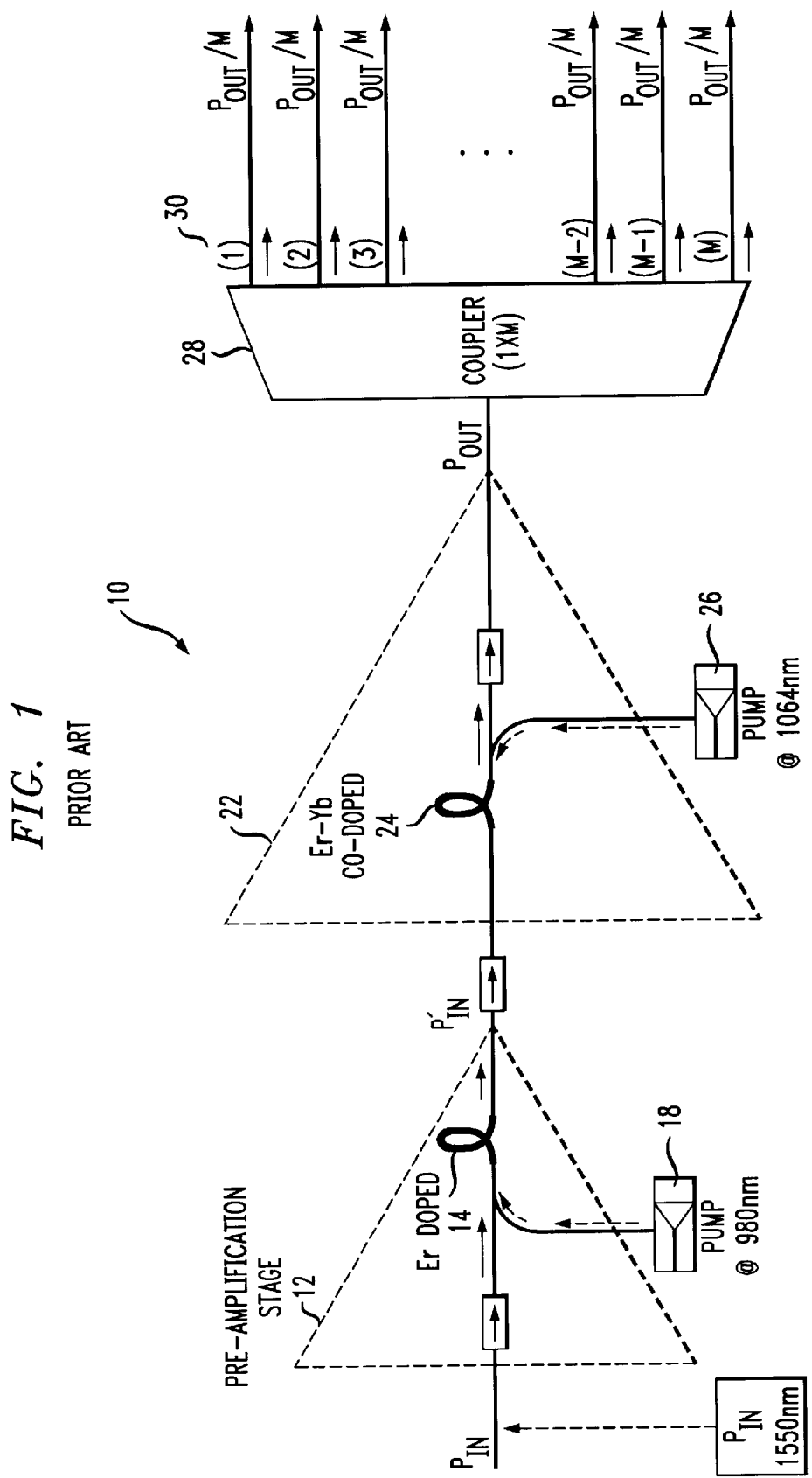
FIG. 1 illustrates an exemplary prior art two-stage hybrid optical amplifier.

In order to best understand the principles of the present invention, it is useful to review the operation of a conventional, well-known two-stage doped fiber amplifier, where one such exemplary prior art two-stage doped fiber amplifier 10 is illustrated in FIG. 1. A pre-amplifier stage 12 comprises a section of erbium-doped fiber 14 and an input isolator 16. A pump signal at an appropriate wavelength to provide amplification (such as 980 nm) is provided by a pump source 18 which is, in this example, applied as a co-propagating input to erbium-doped fiber 14. The input optical signal $P_{in}$ (at a wavelength of 1550 nm) is applied as an input to pre-amplifier stage 12 by first passing through isolator 16, then entering Er-doped fiber 14. BY using a co-propagating amplifying arrangement in pre-amplifier stage 12, how noise amplification is obtained. The pre-amplified output signal, denoted $P'_{in}$ in FIG. 1, thereafter passes through an intermediate isolator 20 and is applied as an input to a high power amplifier stage 22. High power stage 22 includes a section of Er-Yb co-doped fiber 24, which is known to provide higher performance (in terms of output power scalability) due to the fact that ytterbium can absorb pump power available from neodymium-doped sources near 1064 nm and efficiently transfer the power to erbium ions for power application near 1559 nm. A pump source 26 is illustrated as applying a counter-propagating pump signal at 1064 nm to co-doped fiber 24. The high power, amplified output signal $P_{out}$ is first passed through an isolator 23 and is then applied as an input to a 1×M splitter 28, thus creating a plurality of M output signals, each destined for a separate receiver in the system. In a preferred embodiment, 1×M splitter 28 provides equal power splitting, such that each output channel 30 carries a signal having a power of $P_{out}/M$. Since each channel needs to obtain a certain amount of power in order to overcome the propagating losses, and must also exhibit a relatively high power at the receiver, the number of channels M associated with such a splitter is limited.

Figure 2:
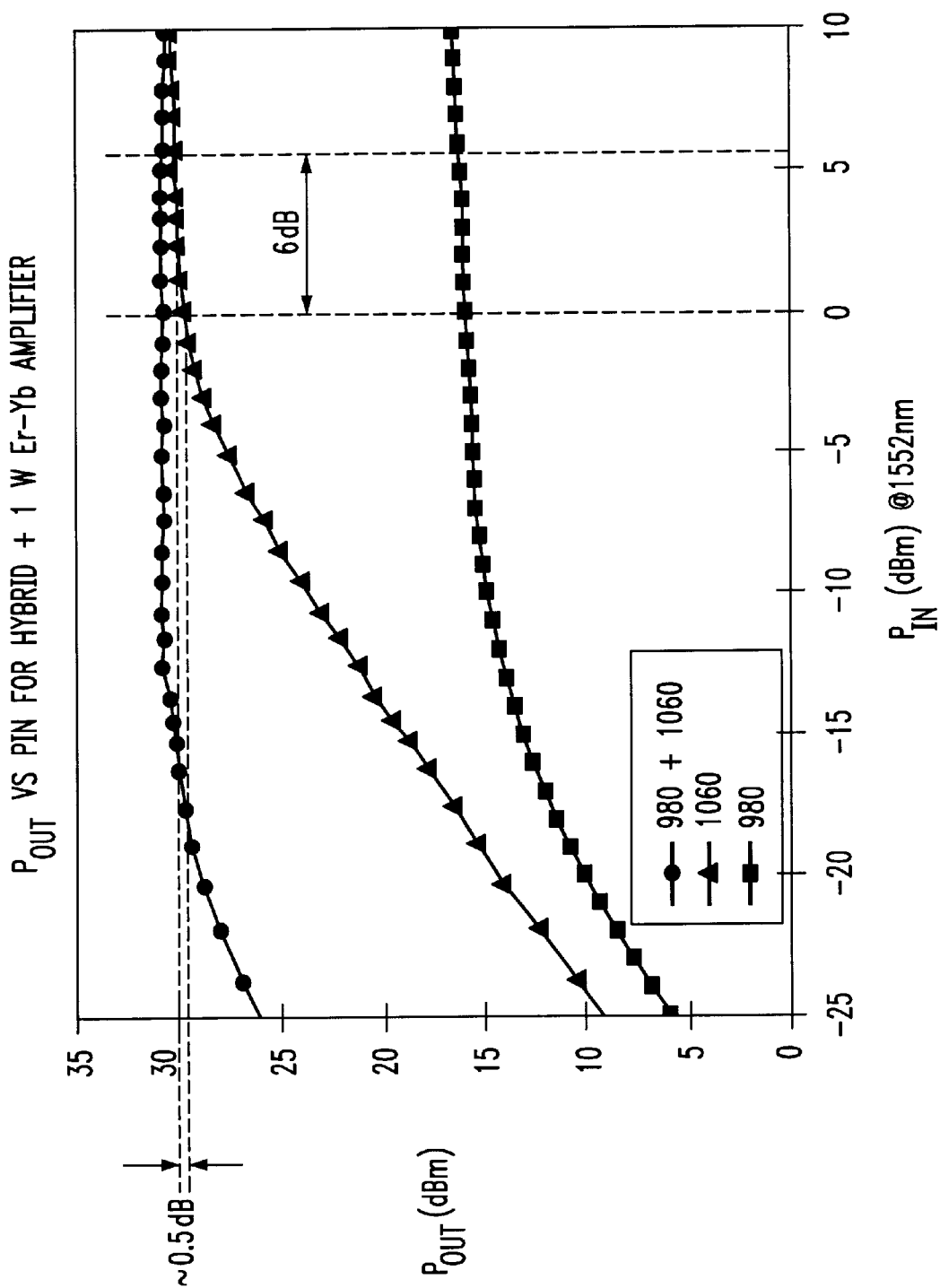
FIG. 2 contains a graph comparing "power out" vs. "power in" for an Er-Yb doped fiber amplifier and an Er-doped fiber amplifier, as well as a combined stage Er/Er-Yb fiber amplifier.

FIG. 2 is a graph of output power from a high power amplifier stage such as the prior art amplifier stage 22 of FIG. 1, in particular characterized for a 6.5 m length of Er-Yb co-doped fiber amplifier, with an injected signal power ($P'_{in}$) at 1550 nm and a pump signal at a wavelength of 1060 nm having an input power of 350 mW. As shown, the amplifier produces as much as 21 dBm output power for a 10 dBm input power. The amplifier output reaches a saturation point for input power greater than 5 dBm, where in the saturation regime any change in input power results in negligible change in the output power.

Figure 3:
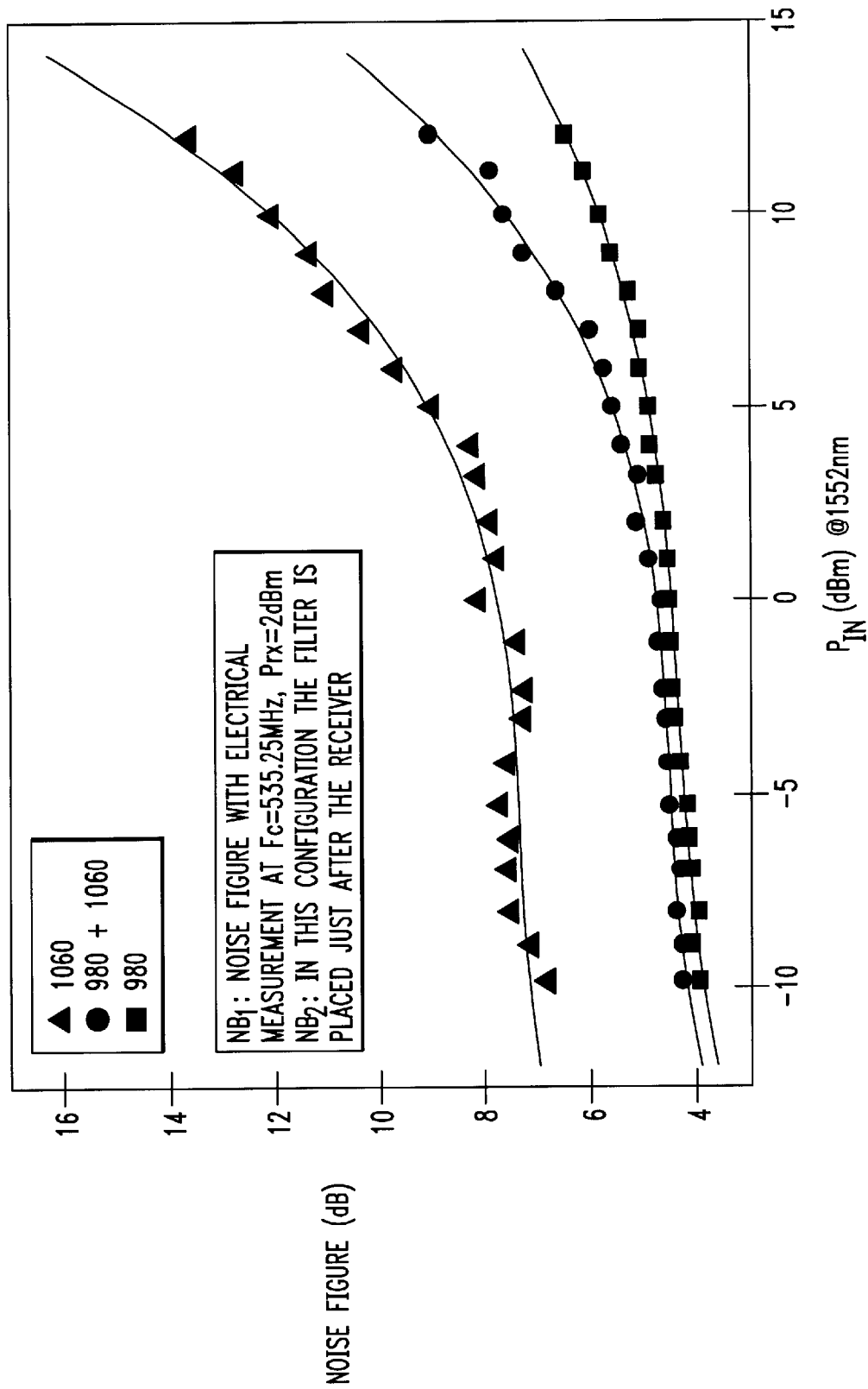
FIG. 3 is a graph comparing noise figure values for the same three amplifier arrangements (i.e., an Er-Yb doped fiber amplifier, an Er doped fiber amplifier, and a combined stage Er/Er-Yb fiber amplifier)

A comparison of the noise figures and output power values for the prior art arrangement of FIG. 1 to both a single stage Er doped fiber amplifier and a single stage Er-Yb co-doped fiber amplifier is shown in FIGS. 3A and B. As shown, an Er-Yb co-doped fiber amplifier produces higher power (21 dBm), but with a relatively high noise figure (>10 dB, external). The Er doped fiber amplifier is the opposite: lower power (16 dBm), but lower noise figure (>5 dB, external). Combining these two separate amplifiers into an arrangement such as amplifier 10 of FIG. 1, however, yields a design with a relatively high power (21 dBm) and relatively low noise figure (<5 dB, external).

Figure 4:
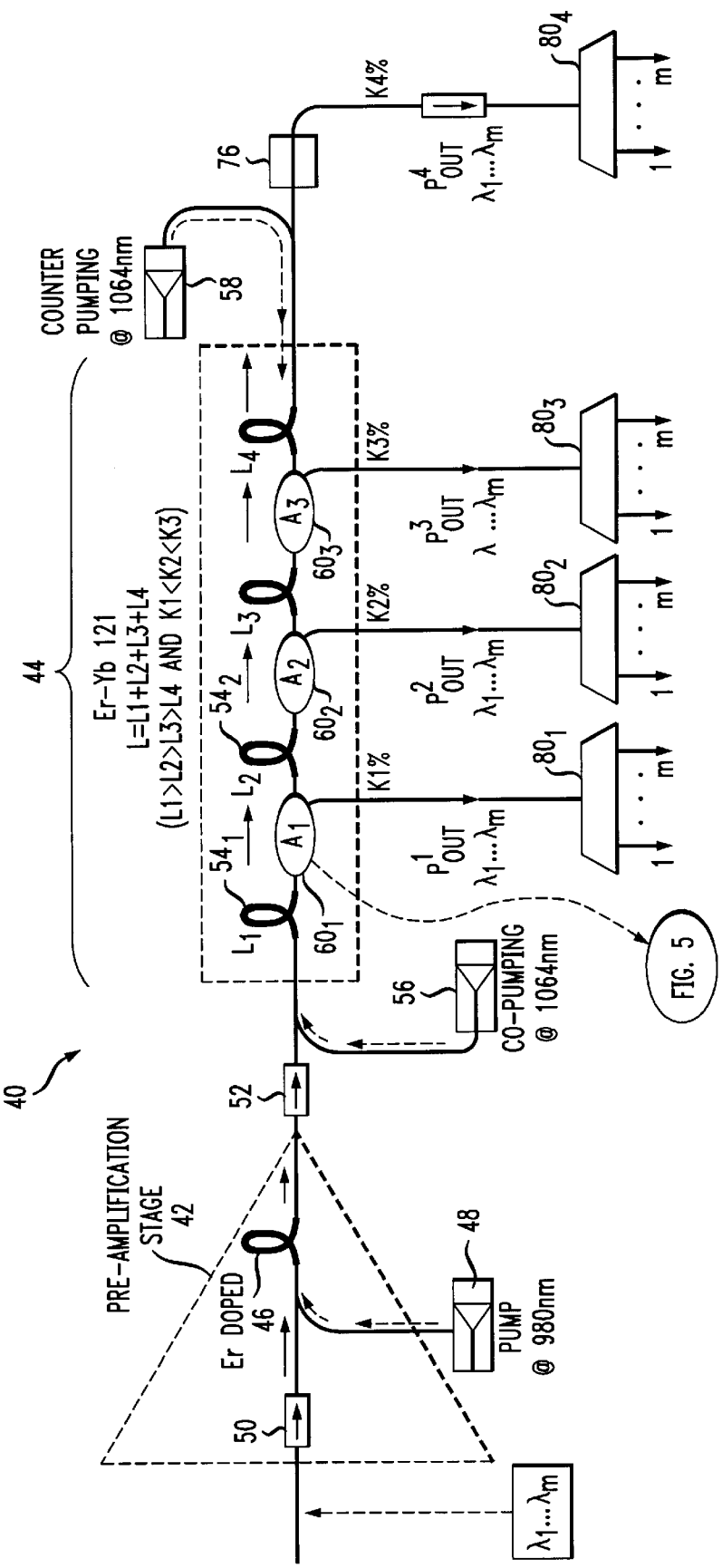
FIG. 4 illustrates an exemplary two-stage doped fiber amplifier of the present invention, including an Er doped fiber preamplifier stage and a multiple-tap Er-Yb doped fiber output stage.

FIG. 4 illustrates an exemplary two-stage, high power doped fiber amplifier 40 formed in accordance with the present invention. As shown, amplifier 40 comprises a preamplifier stage 42 and a multiple-tap high power amplifier stage 44, disposed in series, as shown, so as to provide for the output stage amplification to be multiply-tapped off in series along the output signal path. In particular, preamplifier stage 42 is essentially identical to preamplifier stage 12 discussed above with the prior art amplifier 10. That is, preamplifier stage 42 includes a section of Er-doped fiber 46 and a pump source 48 for supplying a co-propagating pump signal at 980 nm to fiber 46. An input isolator 50 is also included in preamplifier stage 42. The output from preamplifier stage 42, denoted $P'_{in}$, thereafter passes through an intermediate isolator 52 and is applied as an input to multiple-tap output stage 44.

As shown, multiple-tap output stage 44 comprises a plurality of concatenated co-doped fiber sections $54_1, 54_2, \ldots, 54_N$, where in this case four separate sections of co-doped fiber are shown. A first pump source 56 is used to provide a co-propagating pump signal to the plurality of concatenated co-doped fiber sections $54_i$ and is particularly coupled as an input to first co-doped fiber section $54_1$. A second pump source 58 is used to provide a counter-propagating pump signal to the plurality of concatenated co-doped fiber sections $54_i$ and is particularly coupled as an input to the final co-doped fiber section $54_4$. A set of power extractors $60_1$–$60_{N-1}$ is disposed in the multiple-tap power output amplifier such that a separate power extractor $60_i$ is disposed between adjacent sections of co-doped fiber. That is, a first power extract $60_1$ is disposed between co-doped fiber sections $54_1$ and $54_2$, a second power extractor $60_2$ is disposed between co-doped fiber sections $54_2$ and $54_3$ and lastly, a third power extractor $60_3$ is disposed between co-doped fiber sections $54_3$ and $54_4$. Each power extractor functions to remove a predetermined percentage of the amplified output signal (the percentages denoted K1%, K2%, K3% and K4% in FIG. 4).

Figure 5:
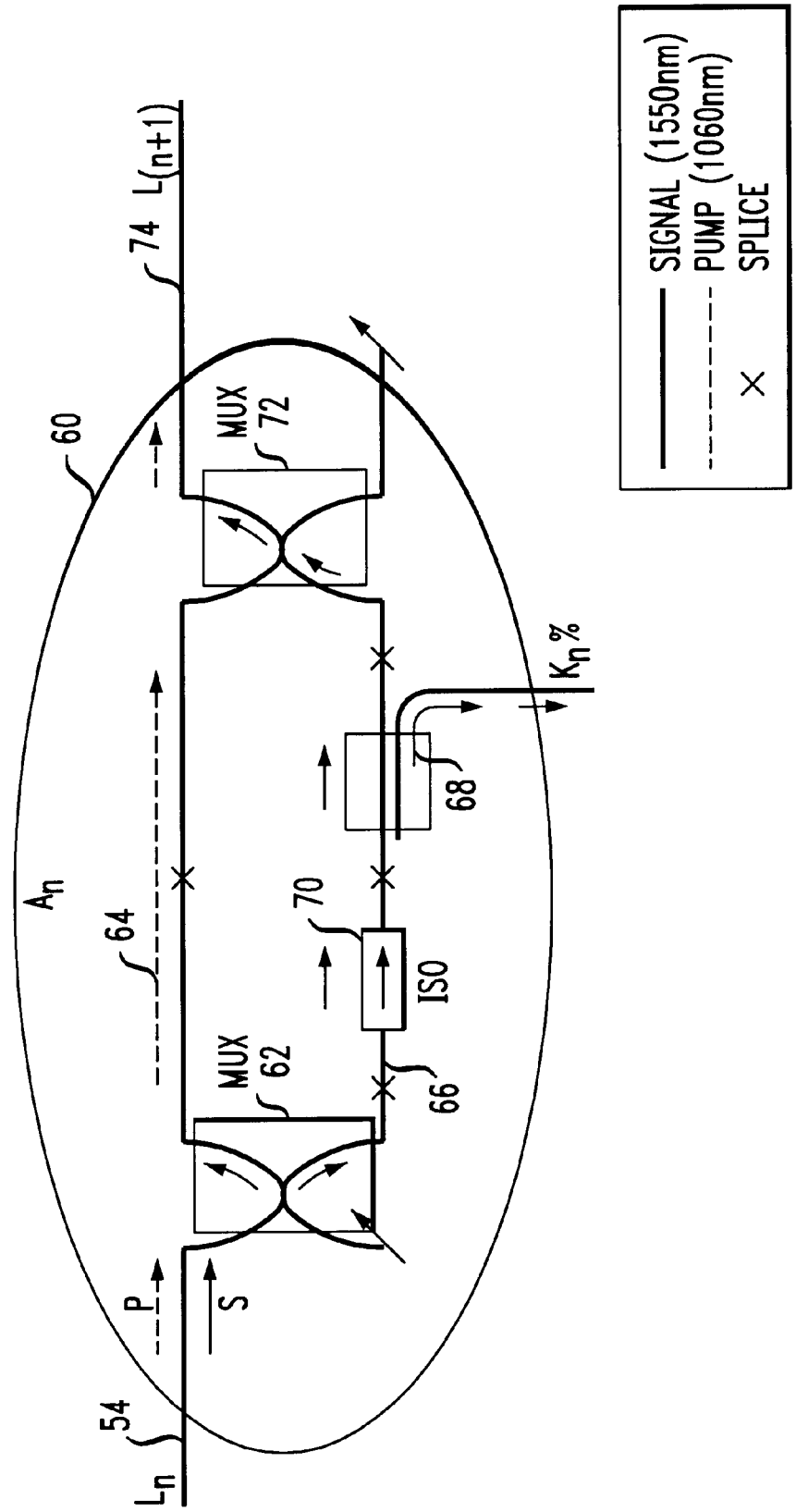
FIG. 5 illustrates an exemplary signal splitting arrangement useful as a tap in the arrangement of FIG. 4.

FIG. 5 illustrates an exemplary power extractor 60 that may be used as an optical tap in the multiple tap output amplifier stage of the present invention. As shown, both a pump signal P and message signal S are applied as inputs to extractor 60, where the input path is one of the sections of doped fiber 54 as illustrated in FIG. 4. A wavelength demultiplexer 62 is used to split these signals along separate paths, maintaining pump signal P along a pump path 64 and diverting message signal S onto a separate signal path 66. An optical coupler 68 is then used to extract a certain percentage of the message signal (denoted $K_n$% in FIG. 5). An isolator 70 may be disposed between demultiplexer 62 and coupler 68 to prevent reflections of the message signal back into demultiplexer 62. Subsequent to tapping off a predetermined portion of message signal S, pump signal P and the remaining message signal S are re-combined in an optical multiplexer 72 and coupled into an output signal path 74. Output signal path 74 then either becomes the input signal path to a following amplifier stage or, if it is the last stage, becomes the final output signal from power amplifier 44.

Referring back to FIG. 4, the final output signal propagating along a signal path 74 such as that described above still includes both pump signal and message signal. Thus, a final demultiplexer 76 is used to remove any residual pump signal P in the output signal.

The arrangement of the present invention may be used with multiple message input signals, each operating at a separate signal wavelength $\lambda_1$–$\lambda_m$. In this case, each power extractor $60_i$ may be followed along its output signal path $74_i$ by a demultiplexer $80_i$, as shown in FIG. 4.

In a preferred embodiment of the present invention, the tap value K of each extractor increases with increasing distance from the input. That is, K1<K2<K3. In this manner, there will remain sufficient message signal strength at the final output such that various noise sources will not overwhelm the message signal and cause errors in the transmission.

The embodiments as discussed above usually comprise a plurality of discrete components. It is also possible to form an amplifier of the present invention in an integrated amplifier arrangement. In general, the spirit and scope of the present invention is considered to be limited only by the claims appended hereto.

What is claimed is:

1. An optical amplifier comprising:
    a preamplifier stage including a rare earth-doped gain medium and an optical pump source for generating an optical pump signal, said preamplifier stage for receiving at least one optical input signal and generating a predetermined amount of optical gain for said at least one optical input signal using the optical pump signal and providing as an output at least one preamplified optical output signal; and a power optical amplifier comprising a plurality of N concatenated output stages including an input coupled to the preamplifier stage output and an $N^{th}$ output beyond the $N^{th}$ output stage, said power amplifier further comprising at least one pump source coupled to either one of the power amplifier input and $N^{th}$ output, each stage comprising a rare earth-ytterbium co-doped gain medium for receiving as inputs the at least one optical input signal and a pump signal, said co-doped gain medium for amplifying the at least one optical input signal in the presence of said at least one pump signal and forming an amplified output signal; and an optical power extractor coupled to the co-doped gain medium for removing a predetermined percentage $K_n\%$ of the amplified output signal therefrom and applying the remaining amplified output signal, if any, to a following stage of the plurality of N concatenated output stages.

2. An optical amplifier as defined in claim 1 wherein the power optical amplifier comprises a single pump source coupled to the input thereto.

3. An optical amplifier as defined in claim 1 wherein the power optical amplifier comprises a single pump source coupled to the $N^{th}$ output of the plurality of N concatenated output stages.

4. An optical amplifier as defined in claim 1 wherein the power optical amplifier comprises a first pump source coupled to the input thereto and a second pump source coupled to the $N^{th}$ output of the plurality of N concatenated output stages.

5. An optical amplifier as defined in claim 1 wherein each optical power extractor comprises an input demultiplexer for receiving on a single input signal path both the at least one input signal and at least one pump signal and separating said signals to provide as outputs said at least one pump signal on a first output path and said at least one input signal on a second output path;

an optical tap disposed along the second output path to couple a predetermined portion $K_n\%$ of the amplified input signal onto an associated amplifier output path; and an output multiplexer for receiving as separate inputs the pump signal along the first output path and the remaining amplified input signal and coupling both signals onto a output amplifier signal path.

6. An optical amplifier as defined in claim 5 wherein at least one optical power extractor further comprises an optical isolator disposed between the input demultiplexer and the optical tap.

7. An optical amplifier as defined claim 5 wherein the predetermined extracted portion $K_n\%$ increases for each subsequent amplifier stage of the plurality of N output stages.

8. An optical amplifier as defined in claim 1 wherein the rare earth-doped preamplifier stage comprises an erbium-doped preamplifier.

9. An optical amplifier as defined in claim 1 wherein the rare earth-doped preamplifier comprises a fiber amplifier.

10. An optical amplifier as defined in claim 1 wherein the rare earth-doped preamplifier comprises an integrated waveguide amplifier.

11. An optical amplifier as defined in claim 1 wherein each rare earth-ytterbium co-doped gain medium in each stage of the power optical amplifier comprises an erbium-ytterbium co-doped gain medium.

12. An optical amplifier as defined in claim 1 wherein each co-doped gain medium comprises an optical fiber.

13. An optical amplifier as defined in claim 1 wherein each co-doped gain medium comprises an integrated waveguide structure.

14. An optical amplifier as defined in claim 1 wherein the at least one input optical signal comprises a plurality of m optical signals, each associated with a different wavelength $\lambda_1-\lambda_m$.

15. An optical amplifier as defined in claim 14 wherein each power extractor further comprises a wavelength demultiplexer at the output thereof for separating the plurality of m amplified optical signals.

* * * * *